(12) United States Patent
Lin

(10) Patent No.: US 6,901,781 B1
(45) Date of Patent: Jun. 7, 2005

(54) STEERING WHEEL LOCK

(76) Inventor: Tsann Hwang Lin, No. 44-6, Chiangtzuker, Hoping Tsun, Chuchi Hsiang, Chiayi County (TW)

( * ) Notice: Subject to any disclaimer, the term of this patent is extended or adjusted under 35 U.S.C. 154(b) by 0 days.

(21) Appl. No.: 10/894,009

(22) Filed: Jul. 20, 2004

(51) Int. Cl.$^7$ ............................................. B60R 25/02
(52) U.S. Cl. ........................................ 70/209; 70/226
(58) Field of Search .................... 70/202, 203, 209, 70/211, 212, 225, 226, 237, 238

(56) References Cited

U.S. PATENT DOCUMENTS

| | | | |
|---|---|---|---|
| 5,199,284 A | * | 4/1993 | Lin ............................. 70/209 |
| 5,297,406 A | * | 3/1994 | Lin ............................. 70/209 |
| 5,381,679 A | * | 1/1995 | Cummins .................... 70/209 |
| 5,636,538 A | * | 6/1997 | Openiano .................... 70/209 |
| 5,816,082 A | * | 10/1998 | Gabrielyan .................. 70/209 |
| 5,887,464 A | * | 3/1999 | Perez .......................... 70/209 |
| 5,996,721 A | * | 12/1999 | Winner ...................... 180/287 |
| 6,173,590 B1 | * | 1/2001 | Witchey ........................ 70/14 |
| 6,470,720 B1 | * | 10/2002 | Yang et al. ................... 70/209 |
| 6,553,797 B2 | * | 4/2003 | Witchey ...................... 70/209 |
| 6,679,089 B2 | * | 1/2004 | Moreton ...................... 70/209 |
| 6,829,914 B2 | * | 12/2004 | Bullock ........................ 70/14 |

* cited by examiner

*Primary Examiner*—Lloyd A. Gall
(74) *Attorney, Agent, or Firm*—Rosenberg, Klein & Lee

(57) ABSTRACT

A steering wheel lock includes a stop bar, an extension rod member, a lock cylinder for locking the extension rod member to the stop bar, two locating plates respectively fastened to the stop bar and the extension rod member, two coupling plates horizontally angle-adjustably fastened to the locating plates, and two hook members respectively pivotally coupled to the coupling plates and locked by a respective locking mechanism for securing the locating plates to a motor vehicle's steering wheel.

8 Claims, 8 Drawing Sheets

STEERING WHEEL LOCK

BACKGROUND OF THE INVENTION

1. Field of the Invention

The present invention relates to a steering wheel lock and more particularly, to a hooking angle-adjustable steering wheel lock that fits different steering wheels.

2. Description of the Related Art

A conventional steering wheel lock essentially comprises a stop bar, an extension rod member axially slidably inserted into one end of the stop bar, a lock cylinder for locking the extension rod member to the stop bar, and two hook members respectively fixedly provided at the top bar and the extension rod member for fastening to a steering wheel. This design of steering wheel lock has drawbacks. Because the hooking angle of the hook members of the steering wheel lock is not adjustable, the steering wheel lock fits only one particular model of steering wheel. This structure of steering wheel lock requires much storage space when not in use because the hook members are not adjustable. Further, this structure of steering wheel lock is not safety in use because the hook members of the steering wheel lock are easily accessible with a saw after locking of the steering wheel lock to the steering wheel of a motor vehicle.

SUMMARY OF THE INVENTION

The present invention has been accomplished under the circumstances in view. It is the main object of the present invention to provide a steering wheel lock, which fits different steering wheels. It is another object of the present invention to provide a steering wheel lock, which ensures high security. To achieve these and other objects of the present invention, the steering wheel lock comprises a stop bar; an extension rod member axially slidably inserted into one end of the stop bar; a lock cylinder provided at one end of the stop bar and adapted to lock the extension rod member to the stop bar; two locating plates respectively fixedly fastened to the stop bar and the extension rod member; two coupling plates respectively fastened to the locating plates; and two hook members respectively mounted in the coupling plates for securing the coupling plates to a motor vehicle's steering wheel; wherein the locating plates each comprise a bottom recess for accommodating the coupling plates, and a vertical mounting screw hole in a bottom wall within the bottom recess; the coupling plates each comprising a bottom barrel, a mounting through hole, and a screw mounted in the mounting through hole and threaded into the vertical mounting screw hole of one said locating plate to lock the respective coupling plate to the respective locating plate; the hook members are respectively installed in the barrels of the coupling plates and set between an operative position and a non-operative position.

DETAILED DESCRIPTION OF THE PREFERRED EMBODIMENT

Figure 1A:
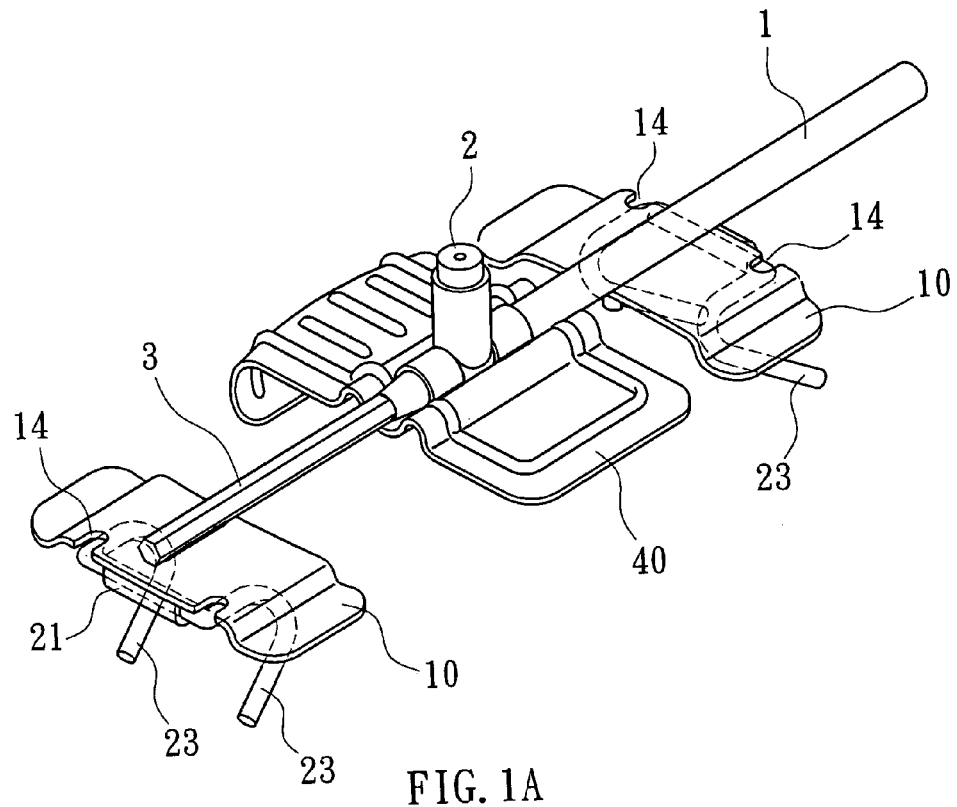
FIG. 1A is a perspective view of a steering wheel according to the first embodiment of the present invention.
Figure 1B:
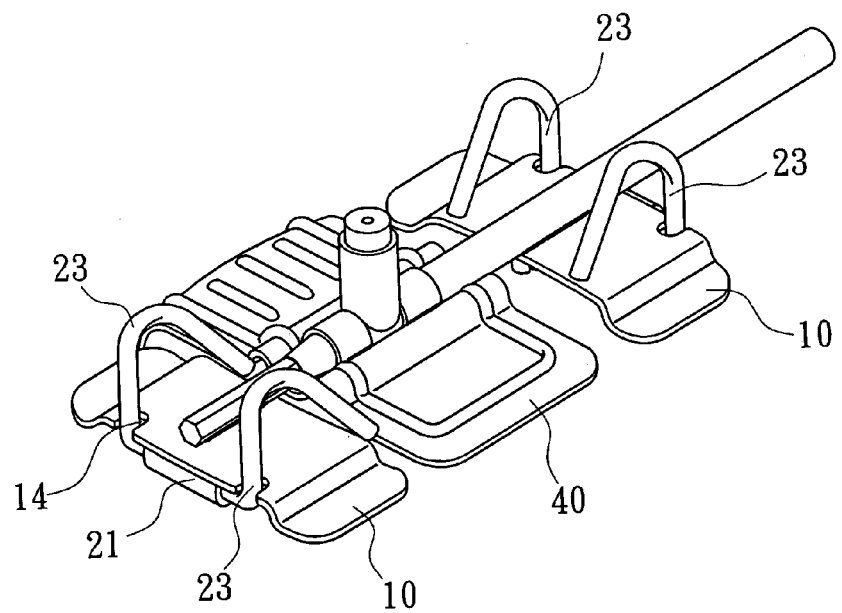
FIG. 1B is another perspective view of the first embodiment of the present invention, showing the received status of the steering wheel lock.
Figure 2:
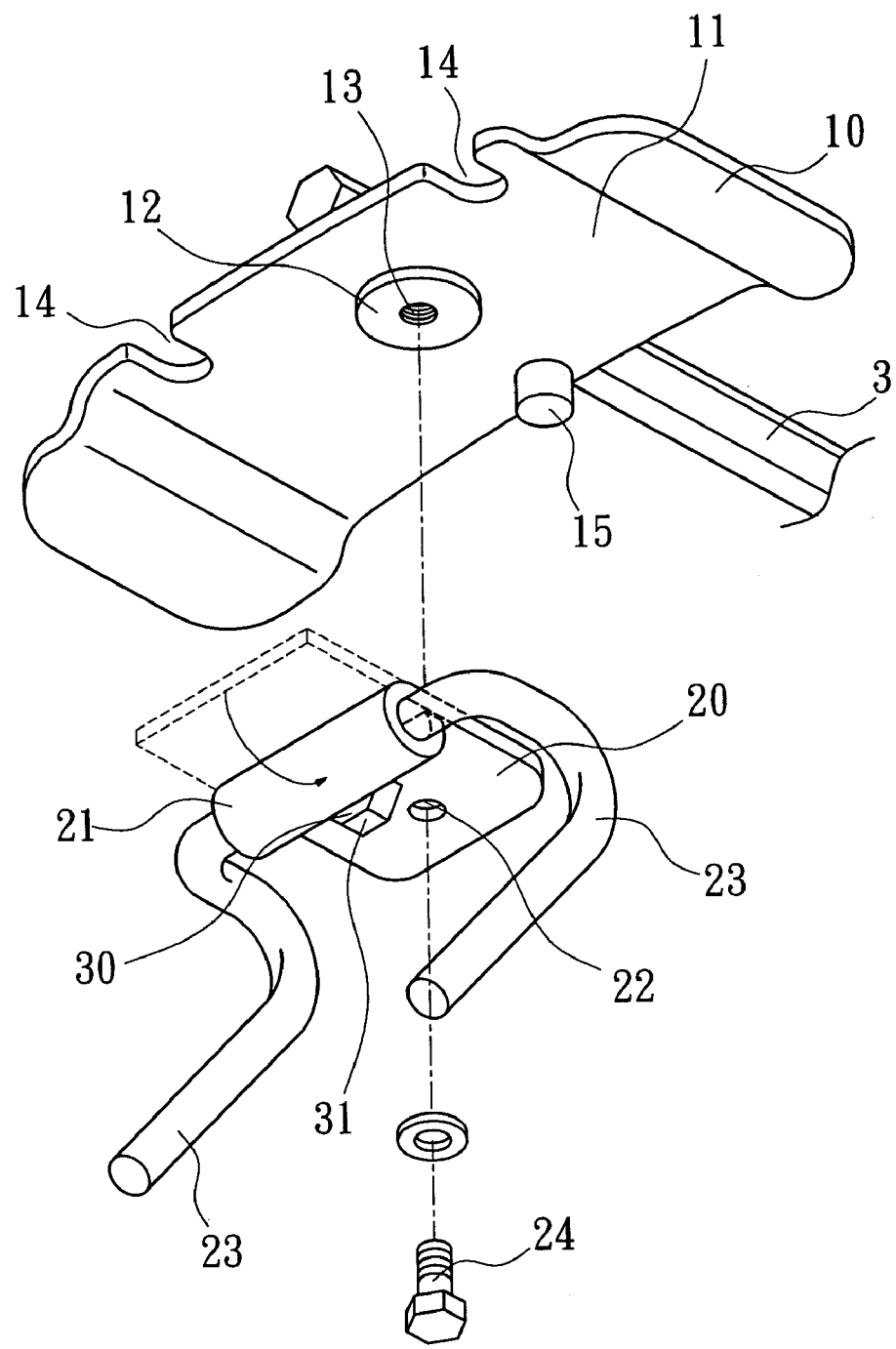
FIG. 2 is an exploded view of a part of the first embodiment of the present invention.

Referring to FIGS. 1~5, a steering wheel lock in accordance with the first embodiment of the present invention is shown comprised of a stop bar 1, a lock cylinder 2, an extension rod member 3, two locating plates 10, two coupling plates 20, a guard plate 40, and two hook members 23.

The extension rod member 3 is axially slidably inserted into one end of the stop bar 1. The lock cylinder 2 is provided at one end of the stop bar 1 and adapted to lock the extension rod member 3 to the stop bar 1.

The guard plate 40 is fixedly fastened to the stop bar 1 below the lock cylinder 2 for covering the center area of the steering wheel 4.

The locating plates 10 are respectively fixedly fastened to the stop bar 1 and the extension rod member 3, each having a bottom recess 11 for accommodating the coupling plates 20, two front locating notches 14 for the positioning of the hook members 23, a circular block 12 formed integral with the bottom wall in the bottom recess 11, a vertical mounting screw hole 13 formed in the circular block 12, and a stop block 15 formed integral with the bottom wall in the bottom recess 11.

The coupling plates 20 are respectively fastened to the locating plates 10 and received in the bottom recess 11 of each locating plate 10. Each coupling plate 20 comprises a barrel 21 fixedly disposed at the bottom side for receiving one hook member 23, and a mounting through hole 22 fastened to the vertical mounting screw hole 13 of one locating plate 10 by a screw 24. When loosened the screw 24, the user can turn the respective coupling plate 20 about the screw 24 relative to the respective locating plate 10 to the desired angle to fit the configuration of the steering wheel 4. Therefore, the invention fits different models of steering wheel. Further, when turning the coupling plate 20 about the screw 24 relative to the respective locating plate 10, the stop block 15 limits the turning angle of the coupling plate 20 to a limited range within 360°.

Figure 3A:
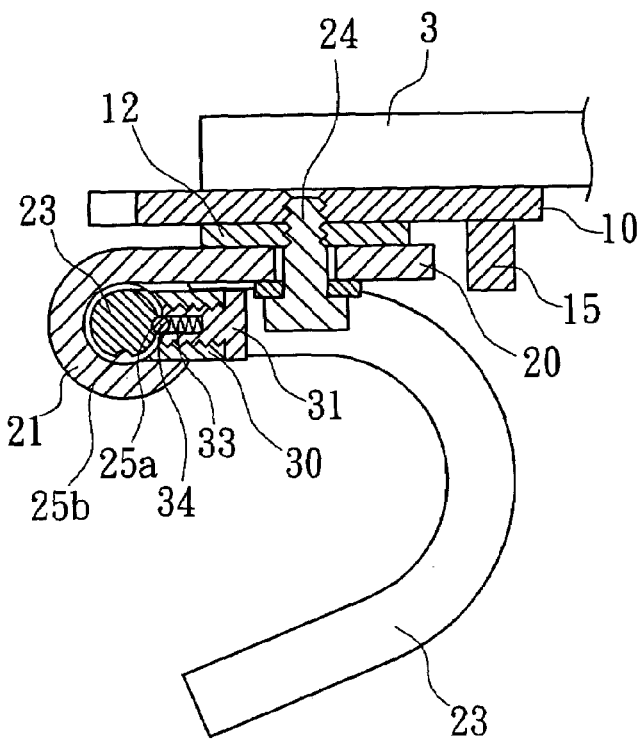
FIG. 3A is a sectional view of a part of the first embodiment of the present invention, showing the hook member in the operative position.
Figure 3B:
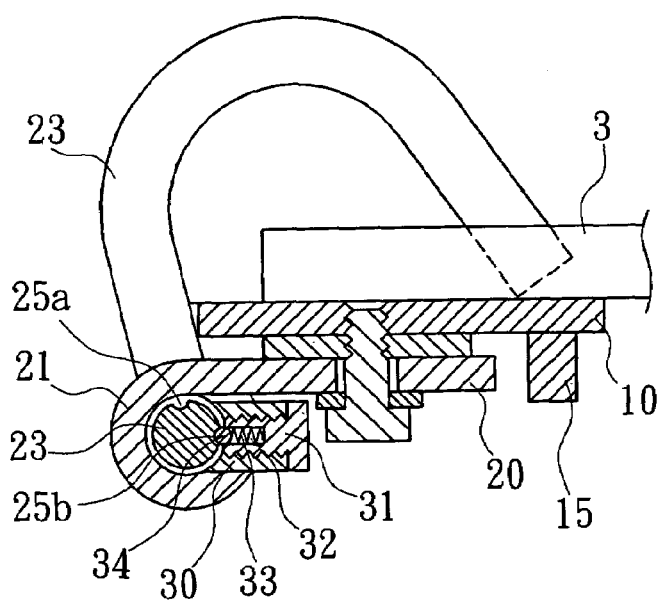
FIG. 3B is similar to FIG. 3A but showing the hook member in the non-operative position.
Figure 4:
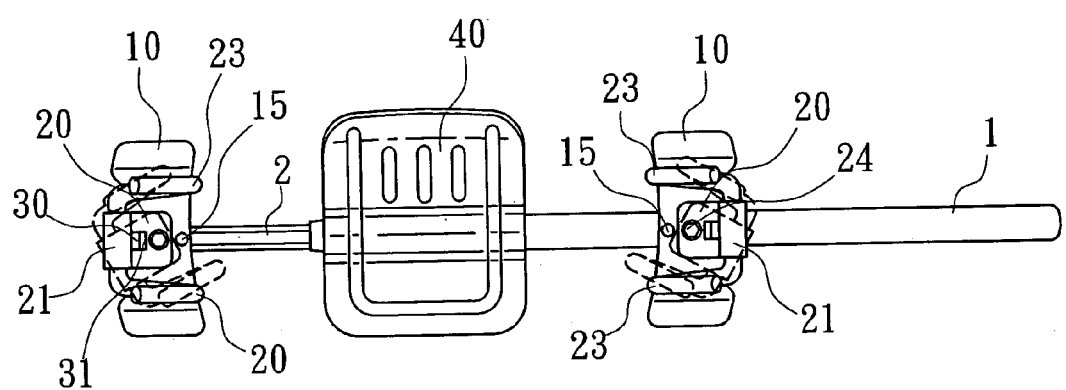
FIG. 4 is a schematic top view of the first embodiment of the present invention, showing adjustment of the coupling plates relative to the locating plates.
Figure 5A:
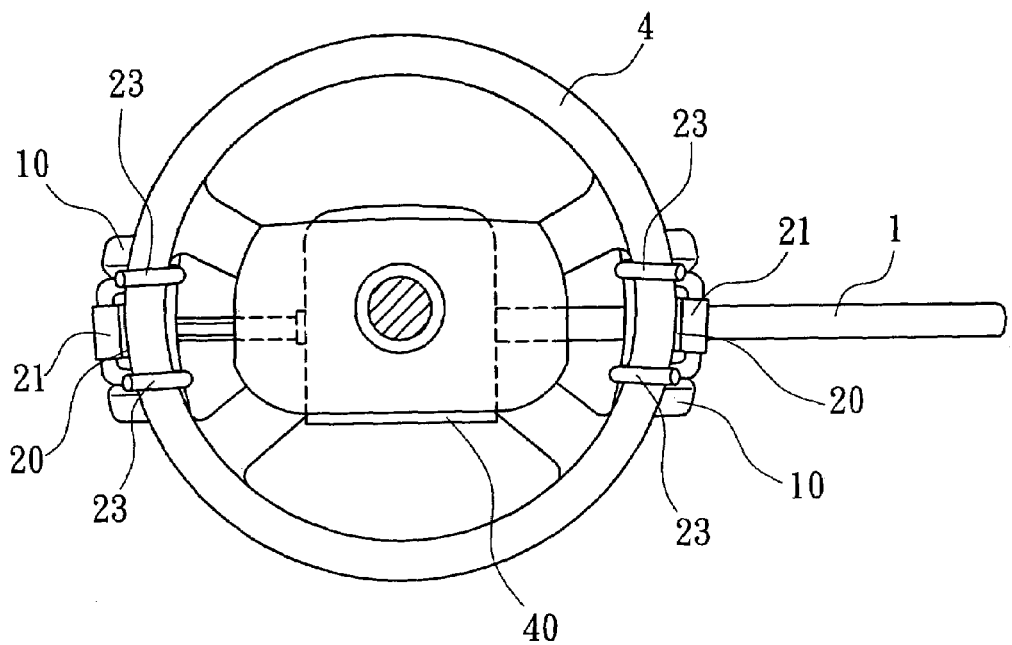
FIG. 5A is a top view, showing the steering wheel lock of the first embodiment of the present invention locked to a steering wheel.
Figure 5B:
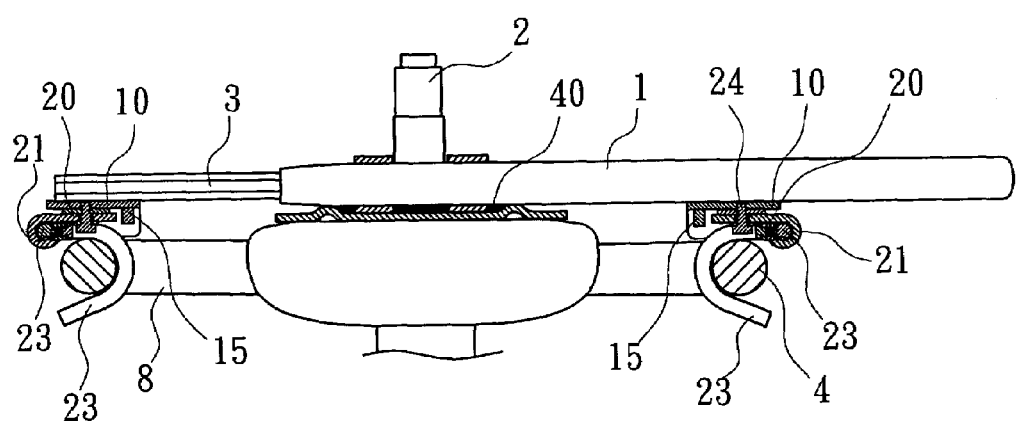
FIG. 5B is a side view in section of FIG. 5A.

The hook members 23 are double hook end type hook members respectively mounted in the barrels 21 of the coupling plates 20 and turnable relative to the barrels 21 between the operative position shown in FIG. 3A and the non-operative position shown in FIG. 3B.

Further, each hook member 23 has two recessed locating portions 25a and 25b on the middle at different angles. The barrel 21 of each coupling plate 20 has an integrated screw holder 30 holding a screw bolt 31. The screw bolt 31 has an axially extended blind hole 32, which receives a compression spring 33 and a steel ball 34. The steel ball 34 is supported on the compression spring 33 and adapted to engage one of the recessed locating portions 25a and 25b. When turned the hook member 23 the operative position shown in FIG. 3A, the steel ball 34 engages the first recessed locating portion 25a, thereby locking the hook member 23 in the operative position. On the contrary, when turned the hook member 23 the non-operative position shown in FIG. 3B, the steel ball 34 engages the second recessed locating portion 25b, thereby locking the hook member 23 in the non-operative position.

Further, the parts of the steering wheel lock are preferably made of hard steel material. When locked to the steering wheel 4, the locating plates 10 cover the periphery of the steering wheel 4 at two sides, and the guard plate 40 covers the center area of the steering wheel 4. Further, the arrangement of the circular block 12 and stop block 15 at each locating plate and the barrel 21 at each coupling plate 20 prohibit insertion of a saw into gaps in between the steering wheel 4 and the steering wheel lock to cut the screw 24. Therefore, the invention is safe in use.

Figure 6A:
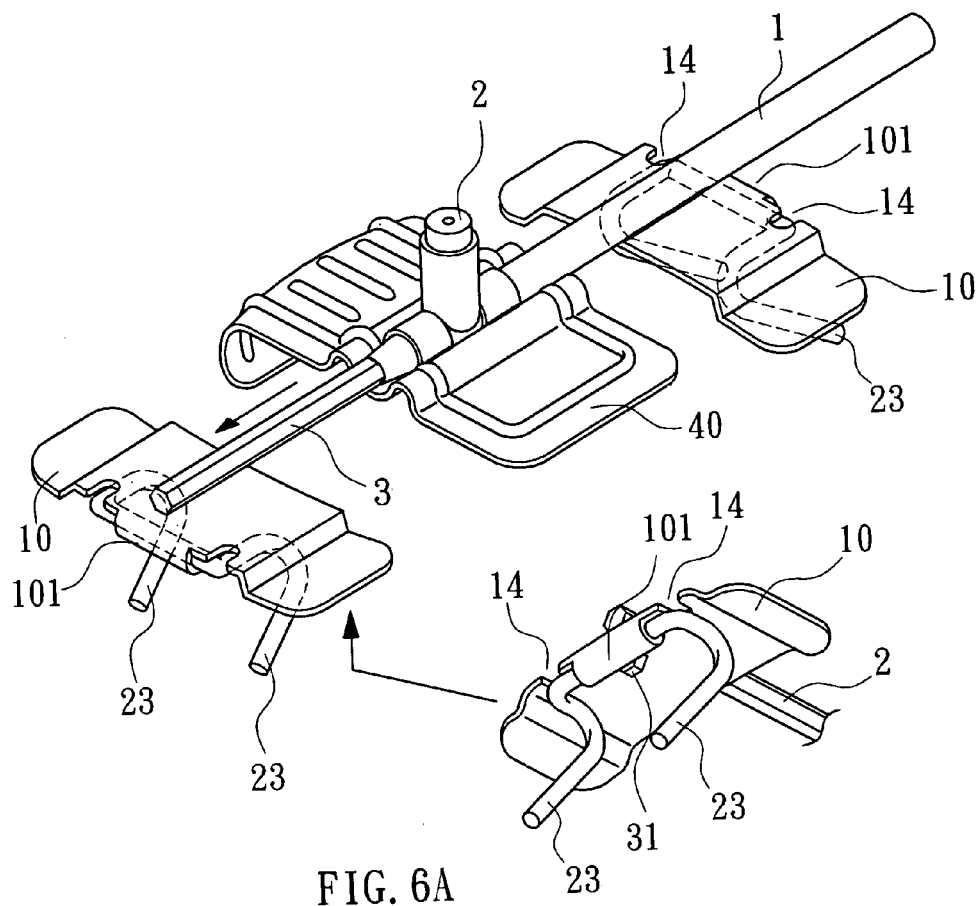
FIG. 6A is a schematic extended out view of a steering wheel lock according to the second embodiment of the present invention.
Figure 6B:
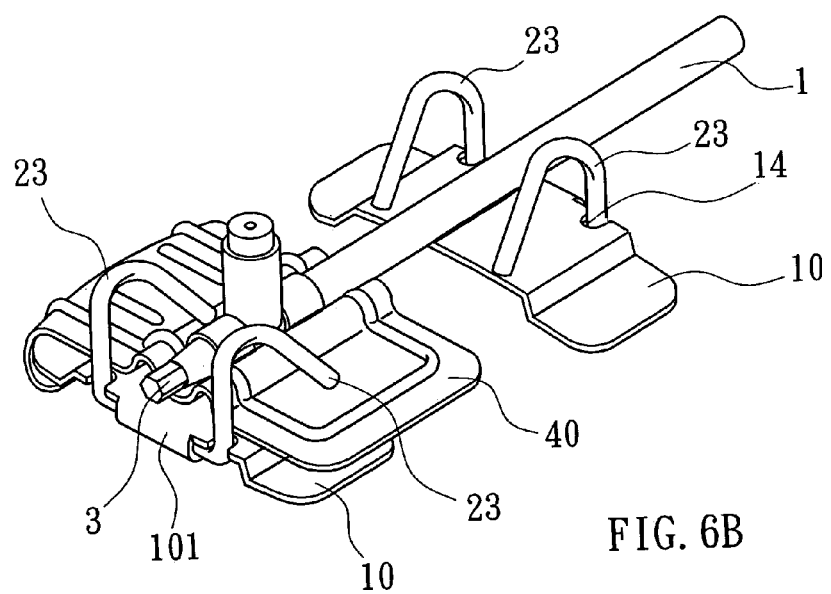
FIG. 6B shows the received status of the steering wheel lock according to the second embodiment of the present invention.

FIGS. 6A and 6B show a steering wheel lock according to the second embodiment of the present invention. This embodiment eliminates the aforesaid coupling plates 20. According to this embodiment, each locating plate 10 is provided with a barrel 101, and the two hook members 23 are respectively coupled to the barrels 101 of the locating plates 10.

Figure 7A:
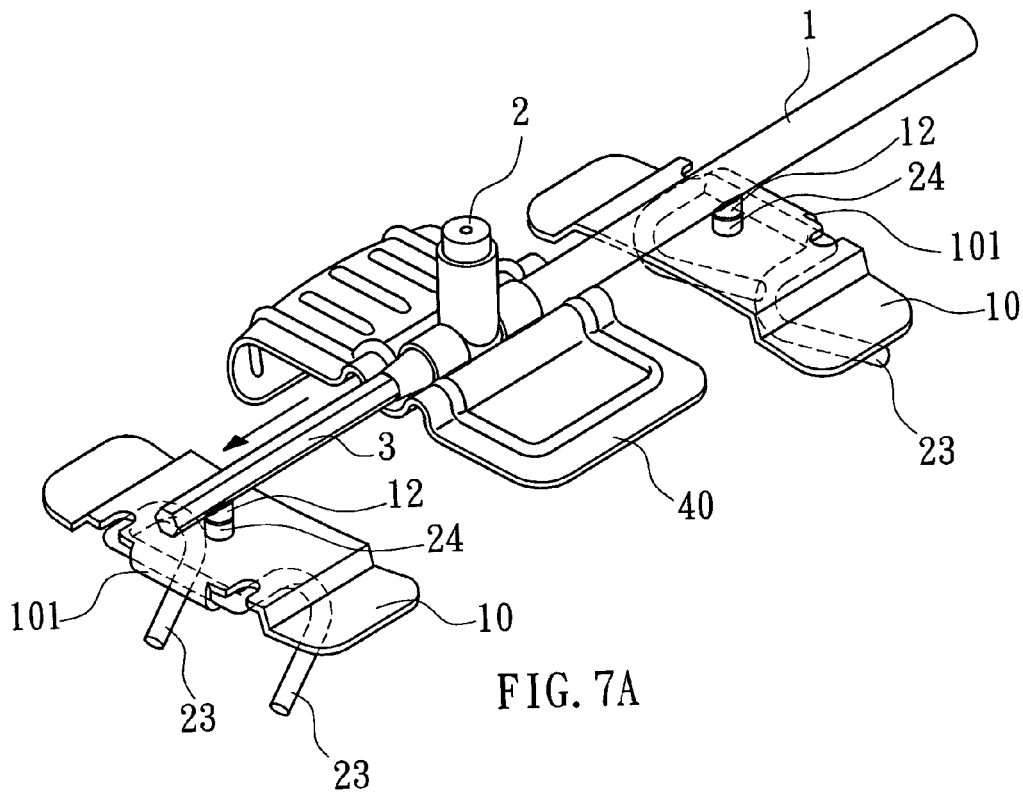
FIG. 7A is a schematic extended out view of a steering wheel lock according to the third embodiment of the present invention.
Figure 7B:
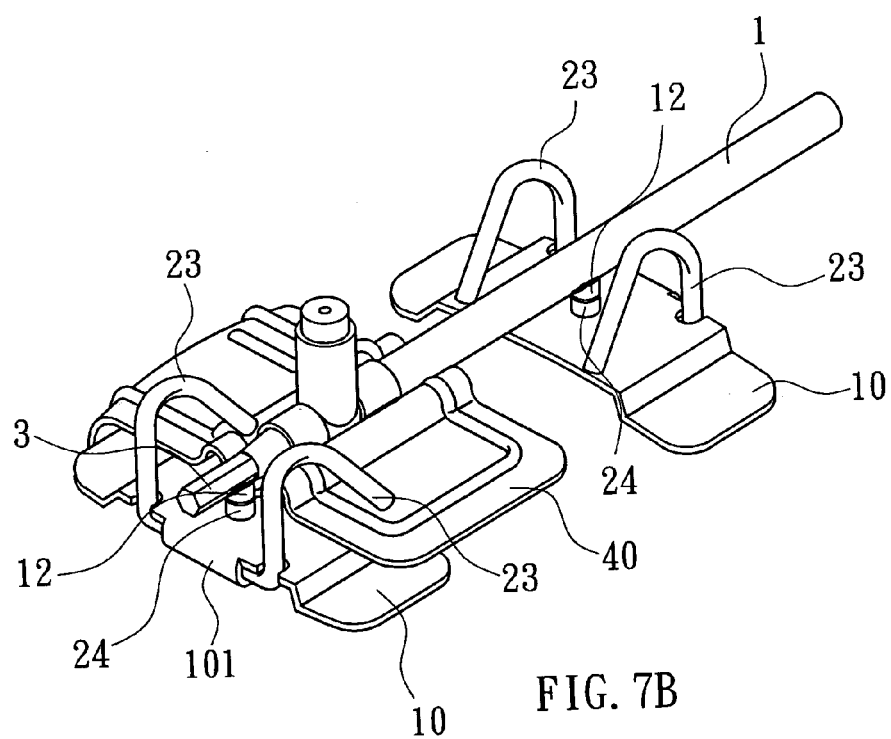
FIG. 7B shows the received status of the steering wheel lock according to the third embodiment of the present invention.

FIGS. 7A and 7B show a steering wheel lock according to the third embodiment of the present invention. This embodiment is substantially similar to the aforesaid second embodiment with the exception of the detachable design of the locating plates 10. According to this embodiment, two circular blocks 12 are respectively provided at the stop bar 1 and the extension rod member 3, and the locating plates 10 are detachably fastened to the circular blocks 12 with a respective screw 24.

Figure 8:
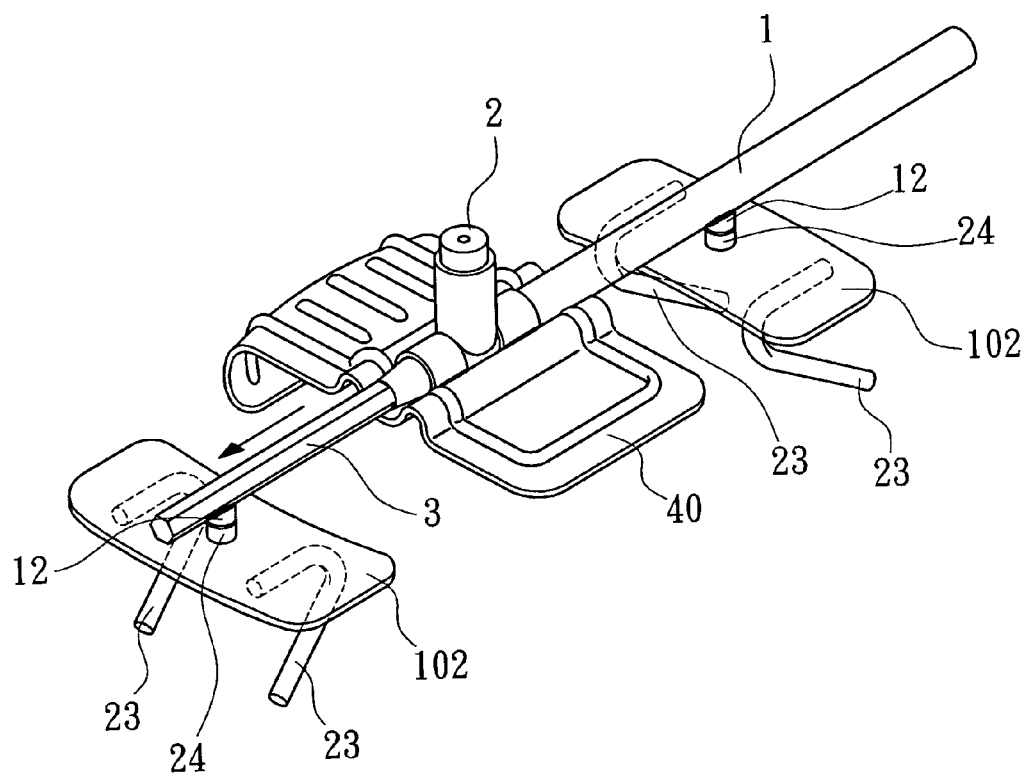
FIG. 8 is a schematic extended out view of a steering wheel lock according to the fourth embodiment of the present invention.

FIG. 8 shows a steering wheel lock according to the fourth embodiment of the present invention. According to this embodiment, the hook members 23 are directly welded to the locating plates 102.

What the invention claimed is:

1. A steering wheel lock comprising:
   a stop bar;
   an extension rod member axially slidably inserted into one end of said stop bar;
   a lock cylinder provided at one end of said stop bar and adapted to lock said extension rod member to said stop bar;
   two locating plates respectively fixedly fastened to said stop bar and said extension rod member;
   two coupling plates respectively fastened to said locating plates; and
   two hook members respectively mounted in said coupling plates for securing said coupling plates to a motor vehicle's steering wheel;
   wherein said locating plates each comprise a bottom recess for accommodating said coupling plates, and a vertical mounting screw hole in a bottom wall within said bottom recess; said coupling plates each comprising a bottom barrel, a mounting through hole, and a screw mounted in said mounting through hole and threaded into the vertical mounting screw hole of one said locating plate to lock the respective coupling plate to the respective locating plate; said hook members are respectively installed in the barrels of said coupling plates and set between an operative position and a non-operative position.

2. The steering wheel lock as claimed in claim 1, wherein each said locating plate further comprises a bottom stop block adapted to limit the turning angle of the respective coupling plate after loosening of the screw of the respective locating plate.

3. The steering wheel lock as claimed in claim 1, wherein each said locating plate has two front locating notches adapted to receive the respective hook member in the non-operative position.

4. The steering wheel lock as claimed in claim 1, wherein each said hook member comprises a first recessed locating portion and a second recessed locating portion formed in a middle part thereof at different angles; the barrel of each said coupling plate is provided with a screw holder holding a screw bolt and a spring-supported steel ball at a front end of said screw bolt for engaging said first recessed locating portion and said second recessed locating portion selectively to lock the respective hook member between said operative position and said non-operative position.

5. The steering wheel lock as claimed in claim 1, wherein said stop bar is fixedly provided with a guard plate adapted to cover the center area of the steering wheel to be locked.

6. A steering wheel lock comprising:
   a stop bar;
   an extension rod member axially slidably inserted into one end of said stop bar;
   a lock cylinder provided at one end of said stop bar and adapted to lock said extension rod member to said stop bar;
   two locating plates respectively fixedly fastened to said stop bar and said extension rod member;
   two hook members respectively mounted in said locating plates for securing said locating plates to a motor vehicle's steering wheel;
   wherein said locating plates each comprise a bottom barrel for receiving said hook members respectively; said hook members are respectively installed in the barrels of said locating plates and set between an operative position and a non-operative position.

7. A steering wheel lock comprising
   a stop bar;
   an extension rod member axially slidably inserted into one end of said stop bar;
   a lock cylinder provided at one end of said stop bar and adapted to lock said extension rod member to said stop bar;
   two locating plates respectively fastened to said stop bar and said extension rod member;
   two hook members respectively mounted in said locating plates for securing said locating plates to a motor vehicle's steering wheel;
   wherein said locating plates each comprise a bottom barrel for receiving said hook members respectively; said hook members are respectively installed in the barrels of said locating plates and set between an operative position and a non-operative position; said stop bar and said extension rod member each have a bottom block and a mounting screw hole in said bottom block; said locating plates are respectively angle-adjustably fastened to the mounting screw hole in the bottom block at each of said stop bar and said extension rod.

8. A steering wheel lock comprising
a stop bar;
an extension rod member axially slidably inserted into one end of said stop bar;
a lock cylinder provided at one end of said stop bar and adapted to lock said extension rod member to said stop bar;
two locating plates respectively fastened to said stop bar and said extension rod member;
two hook members adapted to secure said locating plates to a motor vehicle's steering wheel;
wherein said hook members are respectively welded to said locating plates; said stop bar and said extension rod member each have a bottom block and a mounting screw hole in said bottom block; said locating plates are respectively angle-adjustably fastened to the mounting screw hole in the bottom block at each of said stop bar and said extension rod.

* * * * *